(12) United States Patent
Betts

(10) Patent No.: US 6,366,565 B1
(45) Date of Patent: Apr. 2, 2002

(54) ASYMMETRIC MODEM COMMUNICATIONS SYSTEM AND METHOD

(75) Inventor: William Lewis Betts, St. Petersburg, FL (US)

(73) Assignee: Telogy Networks, Inc., Germantown, MD (US)

( * ) Notice: Subject to any disclaimer, the term of this patent is extended or adjusted under 35 U.S.C. 154(b) by 0 days.

(21) Appl. No.: 09/260,330

(22) Filed: Mar. 1, 1999

Related U.S. Application Data

(62) Division of application No. 08/696,776, filed on Aug. 13, 1996, now Pat. No. 5,991,278.

(51) Int. Cl.[7] .................................................. H04L 5/14
(52) U.S. Cl. ..................... 370/276; 370/466; 375/222
(58) Field of Search ................................ 370/463, 462, 370/385, 276, 282, 286, 296, 468, 465, 466, 498; 379/115, 130; 375/222

(56) References Cited

U.S. PATENT DOCUMENTS

| | | | |
|---|---|---|---|
| 4,597,073 A | 6/1986 | Staples | 370/24 |
| 5,103,227 A | 4/1992 | Betts | 341/61 |
| 5,329,308 A | 7/1994 | Binns et al. | 348/14 |
| 5,394,437 A | 2/1995 | Ayanogin et al. | 375/222 |
| 5,406,583 A | 4/1995 | Dagdeviren | 379/215 |
| 5,450,530 A | 9/1995 | Snyder et al. | 375/220 |
| 5,475,711 A | 12/1995 | Betts et al. | 375/240 |
| 5,550,881 A | 8/1996 | Sridhar et al. | 375/377 |
| 5,550,908 A | 8/1996 | Cai et al. | 379/215 |
| 5,631,923 A | 5/1997 | Kaku et al. | 375/222 |
| 5,663,982 A | 9/1997 | Hodge et al. | 375/222 |
| 5,671,251 A | 9/1997 | Blackwell et al. | 375/222 |
| 5,724,393 A | 3/1998 | Dagdeviren | 375/296 |
| 5,801,695 A | 9/1998 | Townshend | 375/340 |
| 5,809,075 A | 9/1998 | Townshend | 375/254 |

FOREIGN PATENT DOCUMENTS

| | | | |
|---|---|---|---|
| WO | PCT/US95/15924 | 12/1995 | H04M/11/00 |

*Primary Examiner*—Ricky Ngo
(74) *Attorney, Agent, or Firm*—Robby T. Holland; Frederick J. Telecky Jr.

(57) ABSTRACT

An asymmetric modem communications system achieves high speed data transfers through a telephone network that includes both digital and analog communications mediums. In general, the system includes means for concurrently communicating first and second signals, respectively, in opposite directions along the connection between the communications devices and modems for modulating the first and second signals with different modulation techniques. The communications occur in full duplex manner. In a possible implementation, a digital modem is interfaced to a digital network. The digital network is connected with a coder/decoder (codec). The codec is interfaced with a two-wire analog telephone connection, sometimes referred to as a copper loop. The telephone connection is interfaced with an analog modem. Both the digital and analog modems have a transmitter and a receiver. The digital modem has a transmitter that pulse modulates digital data and a receiver that receives and demodulates signals in accordance with the standard V.34 communications protocol (employs quadrature amplitude modulation/demodulation). The analog modem has a transmitter that transmits and modulates signals in accordance with the V.34 communications protocol and a receiver that demodulates the pulse levels into digital data. With the foregoing configuration, asymmetric data communications are realized. Specifically, the analog modem communicates to the digital modem using the V.34 communications protocol at a data rate of between 33,600 b/s and 2400 b/s, inclusive, while the digital modem communicates to the analog modem at a data rate of between 64,000 b/s and 2400 b/s, inclusive.

32 Claims, 2 Drawing Sheets

ASYMMETRIC MODEM COMMUNICATIONS SYSTEM AND METHOD

This application is a divisional of and commonly assigned U.S. Patent Application entitled "Asymmetric Modem Communications System and Method," and assigned Ser. No. 08/696,776 filed Aug. 13, 1996 now U.S. Pat. No. 5,991,278.

FIELD OF THE INVENTION

The present invention generally relates to data communications and, more particularly, to an asymmetric modem communications system and method for achieving high speed data transfers through a telephone network that includes both digital and analog communications mediums.

BACKGROUND OF THE INVENTION

A telephone network is often used as an interface between a digital modem and an analog modem. Generally, a digital modem is a device that communicates digital data by using digital signals that replicate analog waveforms. An analog modem is a device that communicates digital data by encoding the data on analog waveforms.

FIG. 1 shows a typical telephone network 99 for interconnecting a digital modem 101 and an analog modem 102. The digital modem 101 is usually interconnected with a digital network 113 via digital connections 112a, 112b. For instance, the digital modem 101 may be interconnected to a digital network 113 in the form of a public switch telephone network (PSTN) via a Local Exchange Carrier (LEC) subscriber loop. The digital network 113 may comprise, among other things, a T1 carrier system, a basic rate or primary rate Integrated Services Digital Network (ISDN), a fiber optic cable network, a coaxial cable network, a satellite network, or even a wireless digital communications network. Communications over the digital network 113 are conducted in accordance with a pulse code modulation (PCM) scheme. Channel capacity through these digital facilities is typically between 56 and 64 kilobits per second (kb/s). Coding of the signals is also employed so that compression and a constant signal/distortion performance over a wide dynamic range is achieved for optimal transmission of voice signals. A commonly used coding technique is a nonlinear mu-law coding.

The digital network 113 is in turn interconnected with another LEC subscriber loop that includes a coder/decoder (codec) 106. The codec 106 is interconnected with the digital network 113 via digital connections 114a, 114b. The codec 106 is often situated at a telephone company office or along a street near the analog modem subscriber in an SLC device. The codec 106 provides an interface between the digital network 113 and an analog telephone connection 118, sometimes referred to as a copper loop. For communications in the direction from the digital network 113 to the analog modem 102, the codec 106 includes a mu-to-linear-analog converter 109, which includes digital-to-analog (DAC) conversion functionality. The converter 109 converts nonlinear mu-law levels to a linear analog signal. For communications in the direction from the analog modem 102 to the digital network 113, the codec 106 includes a linear-analog-to-mu converter 107, which includes analog-to-digital (ADC) conversion functionality. The converter 107 converts the linear analog signal to nonlinear mu-law levels.

A hybrid 103 is in communication with the DAC and ADC via respective LPFs 111, 105. The hybrid 103 serves to separate the bidirectional analog signals from the analog telephone connection 118 into unidirectional transmit and receive analog signals sent to and received from the ADC 107 and the DAC 109, respectively.

Furthermore, the analog modem 102 is connected to the analog telephone connection 118 and communicates analog signals therewith. Thus, communications occur between the digital modem 101 and the analog modem 102 by way of the digital network 113 and the codec 106.

Researchers have been attempting to increase the speed at which data can be transferred through the telephone network between the digital and analog modems 101, 102. U.S. Pat. No. 5,394,437 to E. Ayanoglu et al. describes a high speed analog modem 102 that is synchronized to the DAC and ADC clocks of the codec 106. Further, a pulse level modulation scheme is utilized to communicate data along the telephone connection 118. With pulse level modulation, a plurality of voltage levels are communicated along the analog telephone connection 118. This system permits data transfer rates above 40 kb/s.

Although the aforementioned system is meritorious to an extent in terms of increasing data transfer rates, it suffers from various undesirable problems and disadvantages.

A primary disadvantage of the Ayanoglu system involves echo problems. Generally, there is sensitivity to quantized echoes because detection occurs at the codec quantizer, and there is an inability to provide echo cancellation prior to detection. More specifically, echo cancellation at the analog modem 102 is not a problem given its exceptional linearity. However, the echo at the codec is a major problem due to the mu-law coding and limited hybrid quality. On a poor subscriber loop, the receive signal is attenuated. The echo is increased due to the impedance mismatch. In fact, the echo level can exceed the receive signal level. Accordingly, both the analog modem 102 and the digital modem 101 will attempt to utilize all PCM levels. When the digital modem 101 echo results from one of the upper compander levels and the analog modem 102 has transmitted on one of the lower levels, then the echo will control the channel bank encoder step size. In this case, it is difficult to resolve the symbols from the analog modem 102.

Another disadvantage of the Ayanoglu system is that it requires complex timing synchronization with the codec.

Hence, there exists a need in the industry for systems and methods for increasing the speed of data transfers through a telephone network 99, which comprises both a digital and analog communications mediums, between a digital modem 101 and an analog modem 102.

SUMMARY OF THE INVENTION

The invention provides for an asymmetric modem communications system and method for achieving high speed data transfers through a telephone network that includes both digital and analog communications mediums. In general, the system includes means for concurrently communicating first and second signals, respectively, in opposite directions along the connection between the communications devices and means for modulating the first and second signals with different modulation techniques. The communications occur in full duplex manner.

In a possible implementation, a digital modem is interfaced to a digital network. The digital network is connected with a coder/decoder (codec). The codec is interfaced with a two-wire analog telephone connection, sometimes referred to as a copper loop. Finally, the telephone connection is interfaced with an analog modem.

Both the digital and analog modems have a transmitter and a receiver. The digital modem has a transmitter that pulse modulates digital data in the sense that it generates and transmits pulse levels and a receiver that receives and demodulates signals in accordance with the standard V.34 communications protocol. Generally, the V.34 protocol employs a form of quadrature amplitude modulation/demodulation. The analog modem has a transmitter that transmits and modulates signals in accordance with the V.34 communications protocol and a receiver that demodulates the pulse levels into digital data.

Communications over the digital network are conducted in accordance with pulse code modulation (PCM). Moreover, communications over the analog connection occur via encoding of digital data on analog waveforms.

With the foregoing configuration, asymmetric data communications are realized. Specifically, the analog modem communicates to the digital modem using the V.34 communications protocol at a data rate of between 33,600 b/s and 2400 b/s, inclusive, while the digital modem communicates to the analog modem at a data rate of between 64,000 b/s and 2400 b/s, inclusive.

Worth noting is that the invention can also be broadly viewed as providing a method for bidirectionally communicating information between first and second communications devices along a connection. The method can be summarized as follows: concurrently communicating first and second signals in opposite directions along the connection between the first and second communications devices, and modulating the first and second signals with different modulation techniques.

The invention has numerous advantages, a few of which are delineated hereafter, as examples.

An advantage of the invention is that data transfers as high as 64 kb/s are achieved through the telephone network from the digital modem to the analog modem, while data is transferred in the reverse direction at up to 33,600 b/s using a conventional V.34 communications protocol.

Another advantage of the invention is that it provides for full duplex communication of signals along the analog telephone connection by using two different modulation techniques, one for each signal that is transferred in opposite directions.

Another advantage of the invention is that because of the two types of modulation that are utilized, echo distortion is minimized. Conventional V.34 modulation utilizes low symbol rates (approximately half) as compared to that described in U.S. Pat. No. 5,394,437 to E. Ayanoglu et al. Thus, each symbol is spread over more than 2 PCM samples so that quantized echo distortion is reduced. Further, V.34 modulation provides detection at the output of a trellis code Viterbi decoder after echo cancellation, receive equalization, precoding, and flexible symbol timing recovery. Finally, V.34 utilizes conventional transmit power levels with modest preemphasis, but no pre-equalization which causes high peak signal levels.

Another advantage of the invention is that it provides for higher speed transactions when a user is interacting with the internet or a computer controlled database.

Another advantage of the invention is that it is simple in design and reliable in operation.

Another advantage of the invention is that it can be implemented with only minor modifications to existing modem designs.

Other objects, features, and advantages of the present invention will become apparent to one with skill in the art upon examination of the following drawings and detailed description. It is intended that all such additional objects, features, and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating principles of the present invention. In the drawings, like reference numerals designate corresponding parts throughout the several views.

DETAILED DESCRIPTION OF THE PREFERRED EMBODIMENT

Figure 1:
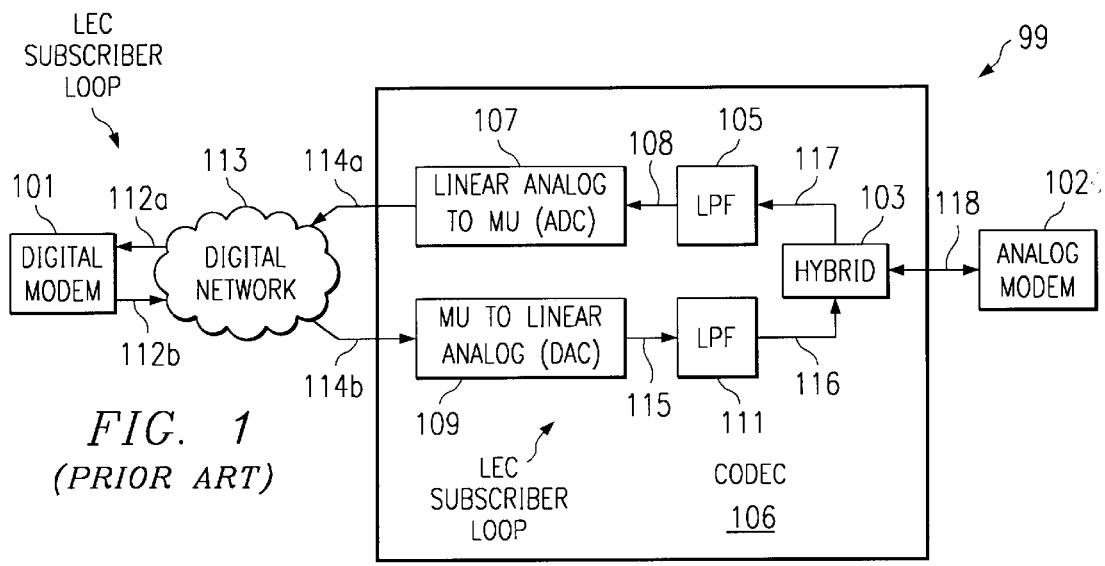
FIG. 1 is an electronic block diagram of a possible implementation for coupling together digital and analog modems over a telephone network.
Figure 2B:
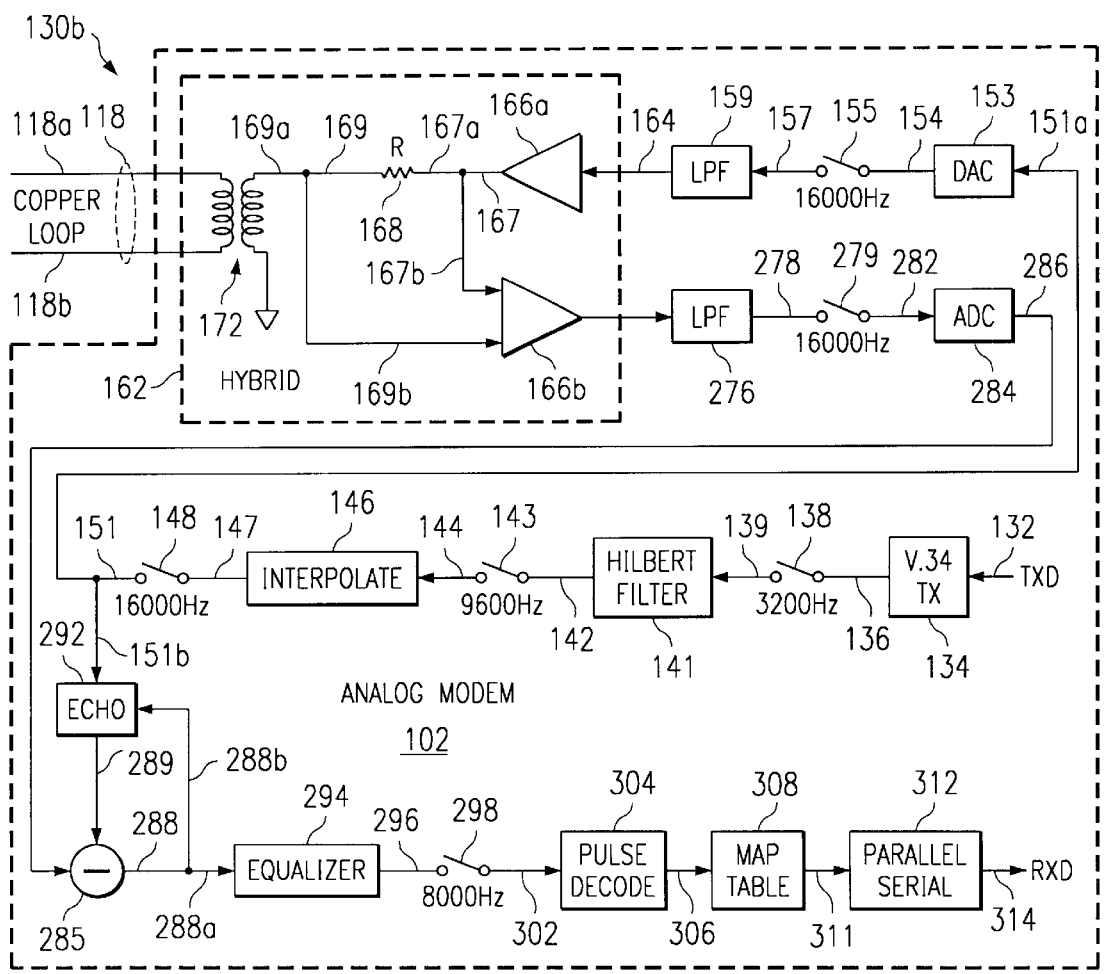
FIGS. 2A and 2B show an electronic block diagram of a possible implementation of an asymmetric modem communications system and method in accordance with the invention.
Figure 2A:
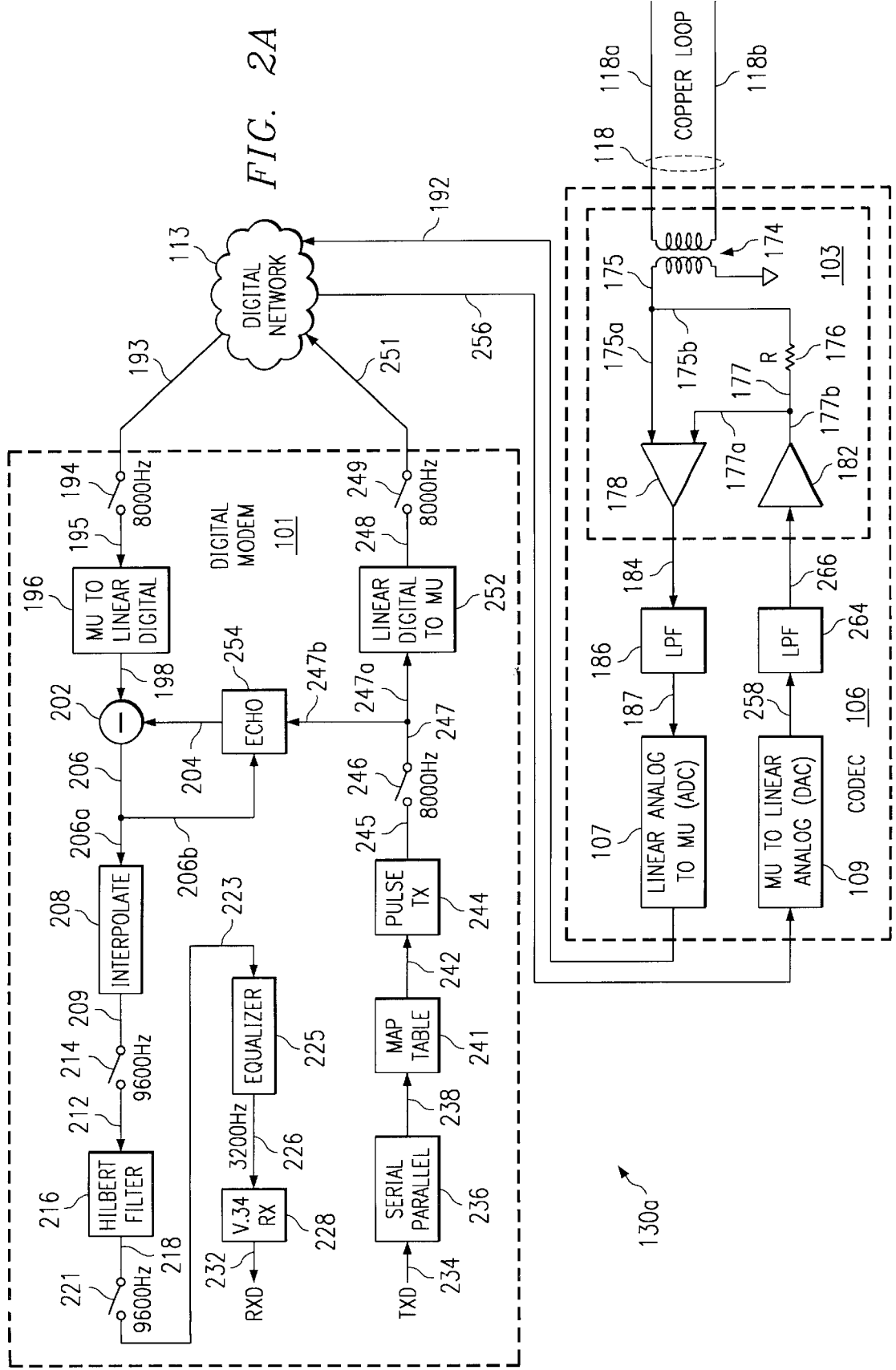

FIGS. 2A and 2B show an electronic block diagram illustrating the asymmetric modem communications system and method of the invention, which is generally denoted by reference numeral 130. The asymmetric modem communications system 130 provides for asymmetric communications between the digital modem 101 and the analog modem 102. Specifically, the asymmetric modem communications system 130 enables communications corresponding with the V.34 protocol from the analog modem 102 to the digital modem 101, while concurrently permitting in a full duplex manner high speed communications from the digital modem 101 to the analog modem 102 using pulse level modulation. As a result, communications from the analog modem 102 to the digital modem 101 can take place at a data rate between 2400 b/s and 33,600 b/s, inclusive, while communications from the digital modem 101 to the analog modem 102 can take place between 2400 b/s and 64,000 b/s, inclusive.

In the discussion hereafter, the apparatus for enabling V.34 communications from the analog modem 102 to the digital modem 101 will be described first, and then the apparatus for permitting pulse level communications from the digital modem 101 to the analog modem 102 will be described thereafter.

Further note that the elements of the analog modem 102 and the elements of the digital modem 101, as described hereafter, can be implemented with respective software, firmware, hardware, or a combination thereof. In the preferred embodiment, the elements of the modem 102 as well as the modem 101 are implemented in software that is stored in a memory and that configures and drives a suitable digital signal processor (DSP) situated in the respective modem. Furthermore, the foregoing software can be stored on any computer-readable medium for use by or in connection with a computer-related system or method. In the context of this document, a computer-readable medium is an electronic, magnetic, optical, or other physical device or means that can contain or store a computer program for use by or in connection with a computer-related system or method.

V.34 Communications

With reference first to FIG. 2B, a serial stream of digital transmit data 132 is communicated to the analog modem 102 from data terminal equipment (DTE), for example but not limited to, a home personal computer (PC).

The V.34 transmitter 134 is configured to receive the bit stream of transmit data 132 from the DTE. The V.34 transmitter 134 implements the standard and conventional modulation suggested by the V.34 recommendation, for examples but not limited to, trellis encoding, mapping, scrambling, etc. The V.34 transmitter 134 outputs a data stream 136 that complies with the V.34 protocol. As is well known in the art, the V.34 protocol is a form of quadrature amplitude modulation. Moreover, the data stream 136 corresponds with one of the fourteen possible V.34 speeds between 2400 b/s, and 33,600 b/s, inclusive.

A sampling switch 138 is configured to receive a V.34 modulated signal 136 from the transmitter 134 and adapted to pulsate the signal to a Hilbert filter 141. The sampling switch 138 operates at the symbol rate of the modem 102. Thus, for a V.34 modem, the symbol rate is 3429, 3200, 3000, 2800, 2743, or 2400 hz. For purposes of simplicity, a sampling rate of 3200 hz will be utilized in the discussion hereafter so that downstream rate figures are whole numbers. Note that a sampling rate of 3200 hz corresponds to a maximum data transfer rate of 31.2 kb/s.

The Hilbert filter 141 receives the signal 139 from the sampling switch 138 and shifts the frequency of the signal constellation to the passband specified by the V.34 recommendation so that the carrier frequency is either 1829 hz or 1920 hz pursuant to the V.34 specification. Moreover, the Hilbert filter 141 implements a bandpass filter to limit the bandwidth (bw) to approximately 3200 hz centered around the carrier frequency.

A sampling switch 143 receives code words from the Hilbert filter 141 and switches the code words at an appropriate rate. In this example where the sampling rate of switch 138 was 3200 hz, then the rate of the switch 143 should be 9600 hz.

An interpolator 146 receives code words from the switch 143 at 9600 hz and outputs the signal 147 at 16,000 hz, as indicated by switch 148. The interpolation process is performed so that pulse levels can be received in the reverse direction at 16,000 hz. A conventional analog modem would not need the interpolator 146.

A DAC 153 receives the code words at 16,000 hz. Preferably, the DAC 153 has a resolution of 14 to 16 bits. The DAC 153 converts the digital signal 151 to an analog signal 154. A sample-and-hold circuit 155 associated with the DAC 153 samples the analog signal 154 at 16,000 hz to produce a 16,000 hz analog signal 157 for a low pass filter (LPF).

The LPF 159 attenuates high frequencies in the signal 157, while permitting passthrough of lower frequencies. The cut off frequency is preferably about 3700 hz in this exemplary implementation.

A hybrid 162 receives a filtered analog signal 164 from the LPF 159 and combines it with an incoming pulse level modulated signal. Specifically, the hybrid 162 includes an amplifier 166a configured to receive the signal 164 and to provide an amplified signal to a resistor (R) 168 and another amplifier 166b. The resistor 168 is connected to a transformer 172 and the amplifier 166b. Thus, as is apparent from the configuration, the transmit signal is passed from the LPF 159 through the amplifier 166a, through the resistor 168, and through the transformer 172 to the copper loop associated with the telephone connection 118. Moreover, the incoming pulse level modulated signal is passed from the cooper loop 118 through the transformer 172, and through the amplifier 166b.

With reference to FIG. 2A, a hybrid 103 is connected to the copper loop 118. This hybrid 103 is within the PSTN and is typically located at a telephone company central office. The hybrid 103 is configured just as the hybrid 162. The hybrid 103 includes a transformer 174 connected to a resistor 176 and an amplifier 178. Further, an amplifier 182 is connected to the amplifier 178 and the resistor 176.

A LPF 186 receives an amplified analog signal 184 from the amplifier 178 of the hybrid 103. The LPF 186 attenuates high frequencies, while permitting passthrough of lower frequencies. Preferably, the cutoff frequency is, approximately 3700 hz.

A linear-analog-to-mu converter 107 receives a filtered linear analog signal 187 from the LPF 186 and converts it to a compressed mu-law digital signal 192 having a series of mu-law digital code words. To arrive at the mu-law digital signal 192, the linear analog signal 187 is digitized to a companded digital signal that is quantized to a nearest 8-bit mu-law signal level.

The digital network 113 receives the mu-law code words 192 serially from the converter 107 and passes them to a digital modem 101 via connection 193, which is typically a T1 carrier connection, a basic rate ISDN connection, or a primary rate ISDN connection. A sampling switch 194 communicates the mu-law code words to a mu-to-linear-digital converter 196. The mu-to-linear-digital converter 196 is configured to perform a mu-law expansion operation on the mu-law digital signal. In this regard, the converter 196 converts each 8-bit mu-law code word to a 14-bit linear code word 198.

A subtractor 202 receives the signal 198 and combines it with an echo canceler signal 204 in order to produce an enhanced signal 206 that is substantially free of echo from the local transmit signal.

An interpolator 208 receives the enhanced signal 206, 206a from the subtractor 202 and performs an interpolate function. After interpolation, the 8000 hz signal 206, 206a is converted to a 9600 hz signal 212, as indicated by switch 214.

A Hilbert filter 216 receives the 9600 hz signal 212 and restricts the frequency of the signal constellation to the passband specified by the V.34 recommendation. The Hilbert filter 216 implements a bandpass filter to limit the bandwidth to about 3200 hz. The output 218 from the filter 216 is switched, as indicated by sampling switch 221 at 9600 hz.

An equalizer 225 receives the signal 223 and equalizes the channel. Essentially, the equalizer 225 eliminates the effects of the LPF 186, the copper loop 118, and the LPF 159 (FIG. 2B) by boosting attenuated frequencies. The equalizer 225 essentially implements an inverse transfer function.

A V.34 receiver 228 receives the equalized signal 226 from the equalizer 225 and implements the standard and conventional demodulation suggested by the V.34 recommendation. The V.34 receiver 228 outputs receive data 232 in the form of a digital data stream to a DTE, for example, a computer with a large database.

B. Pulse Level Communications

A possible implementation of the apparatus for implementing pulse level communications is now described hereafter. As previously mentioned, the pulse level communications in accordance with the present invention enable data transfers at a high speed from the digital modem 101 to the analog modem 102. One form of pulse modulation is described in detail in the previously mentioned U.S. Pat. No. 5,394,437.

Referring to FIG. 2A, transmit data 234 from the local DTE is communicated to a serial-to-parallel converter 236 of the digital modem 101. The transmit data 234 may be scrambled by a scrambler (not shown for simplicity) so that the data is random. This minimizes direct current (DC) frequency contents and helps the echo cancelers and equalizers of the system 130 to operate correctly.

The serial-to-parallel converter 236 converts the incoming serial data stream to a parallel data stream. In the preferred embodiment, the converter 236 outputs 5 to 8 bit code words, depending upon the number of desired levels. Use of 5, 6, 7, or 8 bit code words corresponds to 32, 64, 128, 256 pulse levels, respectively, and to data rates of 40, 48, 56, or 64 kb/s, respectively, as the code words are clocked to the digital network 113 at 8000 hz.

The map table 241 receives the code words 238 and converts them to an expanded linear digital format of, for example, 16 bits each. In the preferred embodiment, the map table 241 is essentially a lookup table. The mapping allows for pulse levels to be omitted where necessary to prevent ambiguity at the pulse decoder in the analog modem 102. Channel noise or distortion on the copper loop 118 may reduce resolution in the pulse decode particularly for pulse levels corresponding to very low signal levels. In this case, many of the low levels should not be used. Using the map table 241 provides a convenient method for omitting the unresolvable pulse levels.

A pulse transmitter 244 receives the linear digital code words (which represent pulse levels) 242 from the map table 241. The pulse transmitter 244 can shape the signal 242, if necessary, and can serve to digitally filter the signal 242. The pulse transmitter 244 drives the linear digital signal 247, via a sampling switch 246 that operates at 8000 hz, to a linear-digital-to-mu converter 252.

The linear-digital-to-mu converter 252 converts the linear digital code words 247 to mu-law code words 248. The words 248 are passed into the digital network 113 via sampling switch 249, which operates at 8000 hz in synchronism with the 8000 hz switch 246. The connection 251 from the switch 249 to the network 113 is typically a T1 or ISDN connection.

The 8000 hz signal 247 from the pulse transmitter 244 is also passed to an echo canceler 254. The echo canceler 254 receives the linear code words from the pulse transmitter 244 as well as the linear digital signal 206 produced by the subtractor 202. The echo canceler 254 shifts the phase and attenuates the amplitude of the signal 247b and correlates it with the signal 206b in order to produce an echo canceler signal 204 that can be combined with the incoming receive signal 198 to eliminate echo. The echo canceler 254 is well known in the art.

The codec 106, which is located typically in a telephone company central office, receives the 8000 hz mu-law signal 256 from the digital network 113. Specifically, the signal 256 is transferred to a mu-to-linear-analog converter 109. The converter 109 produces a decompressed linear analog signal 258 by converting the mu-law code words to a linear analog signal 258.

A LPF 264 receives the linear analog signal 258 from the converter 109 and filters the signal 258. The LPF 264 attenuates higher frequencies while permitting pass through of lower frequencies. The cutoff frequency is a function of the configuration of the codec 106 and is typically about 3700 hz. The LPF 264 communicates a filtered analog signal to the hybrid 103, which places the analog signal on the copper loop 118.

Referring again to FIG. 2B, the hybrid 162 of the analog modem 102 receives the analog signal and passes it to an LPF 276, which filters the signal. In the preferred embodiment, the cutoff frequency is around 8000 hz. The LPF 276 prevents distortion from being modulated into the system. A sampling switch 279 samples the filter signal 278 at 16,000 hz to produce a signal 282 for an ADC 284.

The ADC 284 converts the analog signal 282 to a digital signal. Preferably, the ADC 284 has a precision of 14–16 bits. The ADC 284 outputs a digital signal 286 to a subtractor 285.

The subtractor 285 combines the digital signal 286 with an echo canceler signal 289 from an echo canceler 292. The subtractor 285 produces a signal 288 that is substantially free of echo from the local transmit signal. The enhanced signal 288 is passed back to the echo canceler 292 as well as to an equalizer 294.

The equalizer 294 equalizes the channel by eliminating the effects of the LPF 276, the copper loop 118, and the LPF 264 (FIG. 2A). It essentially boosts attenuated frequencies and performs an inverse transfer function. The equalizer 294 receives the linear digital signal 288 and provides an equalized linear digital signal 296 to a sampling switch 298, which operates at 8000 hz in this example. The switch 298 provides 14–16 bit code words 302 to a pulse decoder 304.

The pulse decoder 304 may be utilized to shape and/or filter the signal 302, if desired or necessary. The pulse decoder 304 forwards a linear digital signal 306 having 14–16 bit code words to a map table 308.

The map table 308 converts the linear binary code words to particular quantized amplitude levels (voltage levels). In the case when 5, 6, 7, or 8 bit code words are output by the serial-to-parallel converter 236 at the digital modem 101, the code words are transformed into one of 32, 64, 128, or 256 different quantized levels. In essence, the map table 308 of the analog modem 102 performs the inverse of the map table 241 in the digital modem 101.

A parallel-to-serial converter 312 receives the binary data code words 311 from the map table 308 and converts them to a serial digital data stream 314, which is passed to the local DTE. As mentioned, use of 5, 6, 7, or 8 bit code words corresponds to 32, 64, 128, 256 pulse levels, respectively, and to data rates of 40, 48, 56, or 64 kb/s, respectively.

Many variations and modifications may be made to the preferred embodiment of the invention as described previously without departing from the spirit and scope of the invention. For example, the data rates and switching speeds may be varied. All such modifications and variations are intended to be included herein within the scope of the present invention, as is defined by the following claims. Other examples of possible modifications are set forth hereafter.

Fractional bit rates can be employed with the pulse level modulation technique to transfer a number of levels, other than precisely 32, 64, 128, or 256. For instance, a modulus converter as described in U.S. Pat. No. 5,103,227 to Betts, the disclosure of which is incorporated herein by reference, can be situated between the serial-to-parallel converter 236 and the map table 241 of the digital modem 101 and between the map table 308 and the parallel-to-serial converter 312 in the analog modem 102 so that 11 bits are converted into 2 code words (thus, effectively, 5.5 bit words) of 46 levels each.

The code levels that are utilized by the pulse level modulation scheme may be determined to optimize data communications. In essence, the system is tested to determine which levels are unresolvable by the analog modem 102. Moreover, unresolvable levels are discarded and not utilized. In order to check levels, the digital modem 101 transfers levels to the analog modem 102, which in turn records the received level at the output of the equalizer 294. The analog modem 102 evaluates the received power levels, makes a determination as to which are resolvable and which are not, constructs a table of usable resolvable levels, and advises the digital modem 101 of the same.

Slave timing may also be employed to eliminate the need for the interpolator 146 (FIG. 2B), 208 (FIG. 2A). In this regard, the timing of the V.34 transmitter 134 in the analog modem 102 is locked to the timing of the pulse transmitter 244 of the digital modem 101. In this configuration, the output sample rate of Hilbert filter 141 could be increased directly to the 16000 hz sampling rate.

In order to avoid transferring DC and to eliminate high frequencies, the digital modem 101 may be designed to send a vacant bit. This will force a spectral shape to the signal exiting the copper loop 118. The foregoing concept is described in U.S. Pat. No. 5,394,437 to E. Ayanoglu et al.

Finally, in the claims hereafter, the structures, materials, acts, and equivalents of all "means" elements and steps are intended to include any structures, materials, or acts for performing the functions specified in connection with said elements.

Wherefore, the following is claimed:

1. A transmitter for transmitting digital data across an analog connection to a remote device, comprising:
    a serial-to-parallel converter configured to receive digital data and to transmit first digital data words based on said received digital data;
    a mapping mechanism configured to receive said first digital data words and to map said first digital data words into second digital data words, said second digital data words selected from digital data words that correspond to resolvable pulse levels when said pulse levels are transmitted across said analog connection and are received by said remote device; and
    a linear-to-mu converter configured to receive said second digital data words, to convert said second digital data words into mu-law code words, and to transmit said mu-law code words to a digital network coupled to said transmitter.

2. The transmitter of claim 1, wherein said mapping mechanism is further configured to receive signals from said remote device and to select said second digital data words based on said signals.

3. The transmitter of claim 1, wherein said mu-law code words are transmitted by said transmitter via pulse code modulation (PCM).

4. The transmitter of claim 1, wherein said second digital data words are expanded relative to said first digital data words.

5. The transmitter of claim 1, wherein said digital network is coupled to a first end of said analog connection and said remote device is coupled to a second end of said analog connection.

6. The transmitter of claim 5, wherein said digital network employs pulse level modulation to transmit said mu-law code words across said analog connection.

7. The transmitter of claim 6, wherein said digital network transmits one of said pulse levels across said digital network in response to a mu-law code word derived from one of said second digital data words, said one pulse level corresponding with said one second digital data word.

8. A transmitter for transmitting digital data across an analog connection to a remote device, comprising:
    a serial-to-parallel converter configured to receive digital data and to transmit first digital data words based on said received digital data;
    a mapping mechanism configured to receive said first digital data words and to map said first digital data words into second digital data words, said second digital data words being in an expanded format relative to said first digital data words; and
    a linear-to-mu converter configured to receive said second digital data words, to convert said second digital data words into mu-law code words, and to transmit said mu-law code words to a digital network coupled to said transmitter.

9. The transmitter of claim 8, wherein said mapping mechanism is further configured to receive signals from said remote device and to select said second digital data words based on said signals.

10. The transmitter of claim 8, wherein said mapping mechanism is configured to eliminate unresolvable pulse levels at said remote device by selecting second digital data words corresponding with pulse levels that are resolvable once said resolvable pulse levels have been transmitted across said analog connection and received by said remote device.

11. The transmitter of claim 8, wherein said digital network is coupled to a first end of said analog connection and said remote device is coupled to a second end of said analog connection.

12. The transmitter of claim 11, wherein said transmitter employs pulse code modulation (PCM) to transmit said mu-law code words to said digital network, and wherein said digital network employs pulse level modulation to transmit said mu-law code words across said analog connection.

13. The transmitter of claim 12, wherein said digital network transmits a resolvable pulse level across said digital network in response to a mu-law code word derived from one of said second digital data words, said resolvable pulse level corresponding with said one second digital data word.

14. A system for transmitting digital data across an analog connection to a remote device, comprising:
    means for transmitting pulse levels corresponding with digital data words across said analog connection to said remote device; and
    means for receiving said digital data words prior to transmission and for translating said digital data words from a first set of digital values to a second set of digital values, said first set having corresponding pulse levels with lower signal levels along said connection as compared to said pulse levels of said second set of digital values.

15. The system of claim 14, further comprising:
    means for receiving said pulse levels transmitted across said analog connection; and
    means for determining which of said received pulse levels are resolvable.

16. The system of claim 14, wherein said means for receiving and said means for determining include a remote device configured to receive said pulse levels transmitted across said analog connection, to determine which of said pulse levels are resolvable, to store values corresponding to resolvable pulse levels, and to notify a transmitting device of said resolvable pulse levels.

17. The system of claim 16, wherein said remote device is further configured to use said stored resolvable values to demodulate said pulse levels received by said remote device.

18. A system for transmitting digital data across a communications connection, comprising:

means for communicating across said communications connection at a low speed rate in accordance with a low speed protocol;

means for translating digital data into pulse levels corresponding to values stored in a map table;

means for transmitting said pulse levels across said communications connection at a high speed rate in accordance with a high speed pulse modulation protocol; and means for adjusting said values in said map table to correspond to pulse levels that are resolvable when transmitted across said communications connection.

19. The system of claim 18, further comprising a remote device configured to receive said pulse levels transmitted across said communications connection, to determine which of said pulse levels are resolvable, to store values corresponding to resolvable pulse levels, and to notify said adjusting means of said resolvable pulse levels.

20. A transmission method for transmitting digital data across an analog connection to a remote device, comprising the steps of:

receiving first digital data words;

translating said first digital data words into second digital data words;

identifying pulse levels that are resolvable when said pulse levels are transmitted across said analog connection and are received by said remote device;

selecting said second digital data words from digital data words corresponding with said pulse levels identified in said identifying step; and transmitting said second digital data words to a digital network.

21. The method of claim 20, further comprising the step of utilizing pulse code modulation (PCM) to perform said transmitting step.

22. The method of claim 20, further comprising the step of selecting digital data words that are in an expanded format relative to said first digital data words to perform said translating step.

23. The method of claim 20, further comprising the step of transmitting said second digital data words from said digital network to said remote device via said analog connection.

24. The method of claim 23, further comprising the steps of:

utilizing pulse code modulation (PCM) to transmit said second digital data words to said digital network; and utilizing pulse level modulation to transmit said second digital data words from said digital network to said remote device.

25. The method of claim 24, further comprising the step of transmitting one of said pulse levels across said analog connection in response to one of said second digital data words, said one pulse level corresponding with said one second digital data word.

26. A transmission method for transmitting digital data across an analog connection to a remote device, comprising the steps of:

receiving first digital data words;

translating said first digital data words to second digital data words having an expanded format relative to said first digital data words;

transmitting said second digital data words to a digital network;

selecting digital data words corresponding with pulse levels that are resolvable once said pulse levels have been transmitted across said analog connection and received by said remote device; and eliminating unresolvable pulse levels at said remote device by utilizing said digital data words selected in said selecting step as said second digital data words.

27. The method of claim 26, further comprising the step of transmitting said second digital data words from said digital network to said remote device via said analog connection.

28. The method of claim 27, further comprising the steps of:

utilizing pulse code modulation (PCM) to transmit said second digital data words to said digital network; and utilizing pulse level modulation to transmit said second digital words from said digital nework to said remote device.

29. The method of claim 28, further comprising the step of transmitting a pulse level across said analog connection in response to one of said second digital words, said pulse level corresponding with said one digital data word.

30. A method for transmitting digital data across an analog connection to a remote device, comprising the steps of:

transmitting pulse levels corresponding with digital data words across said analog connection to said remote device; and translating said digital data words, prior to transmission, from a first set of digital values to a second set of digital values, said first set having corresponding pulse levels with lower signal levels along said analog connection as compared to said pulse levels of said second set of digital values.

31. A method for transmitting digital data across a communications connection, comprising the steps of:

communicating across said communications connection at a low speed rate in accordance with a low speed protocol;

translating digital data into pulse levels corresponding to values stored in a map table;

transmitting said pulse levels across said communications connection at a high speed rate in accordance with a high speed pulse modulation protocol; and adjusting said values in said map table to correspond to pulse levels that are resolvable when transmitted across said communications connection.

32. The method of claim 31, further comprising the steps of:

receiving said pulse levels transmitted across said communications connection; and determining which of said received pulse levels are resolvable.

* * * * *